US012759045B2

(12) United States Patent
Bruck

(10) Patent No.: US 12,759,045 B2
(45) Date of Patent: Oct. 13, 2026

(54) METHOD OF AND APPARATUS USING A SPLIT WIPER FOR THE REPAIR OF OBJECTS PROTRUDING ABOVE A POWDER BED

(71) Applicant: Siemens Energy, Inc., Orlando, FL (US)

(72) Inventor: Gerald J. Bruck, Myrtle Beach, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 974 days.

(21) Appl. No.: 18/001,596

(22) PCT Filed: Jul. 28, 2020

(86) PCT No.: PCT/US2020/043846
§ 371 (c)(1),
(2) Date: Dec. 13, 2022

(87) PCT Pub. No.: WO2022/025867
PCT Pub. Date: Feb. 3, 2022

(65) Prior Publication Data
US 2023/0234128 A1 Jul. 27, 2023

(51) Int. Cl.
*B22F 5/04* (2006.01)
*B22F 10/28* (2021.01)
(Continued)

(52) U.S. Cl.
CPC ................ *B22F 5/04* (2013.01); *B22F 10/28* (2021.01); *B22F 10/38* (2021.01); *B22F 10/85* (2021.01);
(Continued)

(58) Field of Classification Search
CPC .......... B22F 10/28; B22F 12/67; B22F 10/36; B22F 10/73; B22F 12/52; B22F 12/70;
(Continued)

(56) References Cited

U.S. PATENT DOCUMENTS 10,926,356 B2 2/2021 Cheng
2013/0264750 A1* 10/2013 Hofacker .............. B22F 12/226 425/174
(Continued)

FOREIGN PATENT DOCUMENTS

CN 105246644 A 1/2016
CN 110814341 A 2/2020
(Continued)

OTHER PUBLICATIONS

International Search Report and Written Opinion of the International Searching Authority mailed Jun. 22, 2021 corresponding to PCT Application No. PCT/US2020/043846 filed Jul. 28, 2020.

*Primary Examiner* — Chris Q Liu
(74) *Attorney, Agent, or Firm* — Mark Rubio

(57) ABSTRACT

A method of repairing a component using an additive manufacturing process is presented. The method includes submerging the component into a powder bed so that a portion of the component to be repaired is level with a surface of the powder bed and a protruding portion of the component protrudes above the surface of the powder bed, positioning a split wiper that includes a first wiper segment and a second wiper segment in the powder bed at the surface, advancing a quantity of powder by translating the first wiper segment and the second wiper segment across the surface of the powder bed, and directing a laser beam across the surface to fuse powder particles of the powder bed to the underlying substrate forming a layer of the component. Each of the first wiper segment and the second wiper segment
(Continued)

follow a different contour of the protruding portion at the surface.

18 Claims, 8 Drawing Sheets

(51) Int. Cl.

| | |
|---|---|
| ***B22F 10/38*** | (2021.01) |
| ***B22F 10/85*** | (2021.01) |
| ***B23K 26/342*** | (2014.01) |
| ***B23K 101/00*** | (2006.01) |
| ***B23P 6/00*** | (2006.01) |
| ***B33Y 10/00*** | (2015.01) |
| ***B33Y 50/02*** | (2015.01) |
| ***B33Y 80/00*** | (2015.01) |

(52) U.S. Cl.

CPC ............ *B23K 26/342* (2015.10); *B23P 6/002* (2013.01); *B33Y 10/00* (2014.12); *B33Y 50/02* (2014.12); *B33Y 80/00* (2014.12); *B22F 2998/10* (2013.01); *B23K 2101/001* (2018.08)

(58) Field of Classification Search

CPC .. B22F 2999/00; B22F 12/222; B22F 12/226; B22F 12/50; B22F 12/55; B22F 12/63; B22F 12/90; B22F 10/37; B22F 10/80; B22F 12/49; B22F 12/53; B22F 12/57; B22F 3/004; B22F 10/14; B22F 10/32; B22F 10/366; B22F 10/50; B22F 12/13; B22F 12/224; B22F 12/37; B22F 12/41; B22F 12/88; B22F 2998/10; B22F 5/04; B22F 1/107; B22F 10/00; B22F 10/22; B22F 10/25; B22F 10/30; B22F 10/31; B22F 10/322; B22F 10/47; B22F 10/62; B22F 10/68; B22F 12/30; B22F 12/33; B22F 12/45; B22F 12/47; B22F 12/82; B22F 2003/244; B22F 2005/103; B22F 2202/01; B22F 2202/15; B22F 2203/00; B22F 2207/01; B22F 2207/13; B22F 3/003; B22F 5/009; B22F 5/10; B22F 7/06; B33Y 30/00; B33Y 10/00; B33Y 50/02; B33Y 40/00; B33Y 70/10; B33Y 40/20

USPC ..................................................... 219/121.64

See application file for complete search history.

(56) References Cited

U.S. PATENT DOCUMENTS

| | | | | |
|---|---|---|---|---|
| 2016/0067923 | A1* | 3/2016 | James | B22F 10/28 264/497 |
| 2017/0291260 | A1 | 10/2017 | McCarren et al. | |
| 2018/0194074 | A1* | 7/2018 | Shi | B23K 26/342 |
| 2018/0354034 | A1* | 12/2018 | Vaes | B33Y 50/02 |
| 2019/0061237 | A1* | 2/2019 | Kimblad | B29C 64/393 |
| 2019/0118472 | A1* | 4/2019 | Torrealba | B29C 64/153 |
| 2019/0134746 | A1* | 5/2019 | Volk | B22F 12/224 |
| 2019/0344346 | A1 | 11/2019 | Tucker | |
| 2019/0366433 | A1* | 12/2019 | Aydin | B22F 12/90 |
| 2020/0047286 | A1* | 2/2020 | Cheng | B29C 64/393 |
| 2020/0101667 | A1* | 4/2020 | Prakash | B29C 64/329 |
| 2020/0101668 | A1* | 4/2020 | Prakash | B33Y 50/02 |
| 2020/0254522 | A1* | 8/2020 | Redding | B33Y 30/00 |

FOREIGN PATENT DOCUMENTS

| | | | |
|---|---|---|---|
| DE | 102010041284 | A1 | 3/2012 |
| DE | 102014221501 | A1 | 4/2016 |
| DE | 102016214251 | A1 | 2/2018 |
| EP | 3639951 | A1 | 4/2020 |
| FR | 3081755 | A1 | 12/2019 |
| JP | 2006205456 | A | 8/2006 |
| WO | 2014121060 | A1 | 8/2014 |
| WO | 2018001695 | A1 | 1/2018 |
| WO | 2019094286 | A1 | 5/2019 |

* cited by examiner

METHOD OF AND APPARATUS USING A SPLIT WIPER FOR THE REPAIR OF OBJECTS PROTRUDING ABOVE A POWDER BED

BACKGROUND

Aspects of the present disclosure generally relate to additive manufacturing (AM), and more specifically to powder bed fusion processes such as selective laser melting (SLM) and selective laser sintering (SLS). In particular, the disclosure relates to manufacture and repair of a component having a portion protruding above the powder bed.

Powder bed fusion processes, such as selective laser melting (SLM) and selective laser sintering (SLS), include a layer by layer deposit of powder starting at a build plate followed by laser melting/laser sintering of each layer. Wipers used in SLM and SLS are elements that extend across the powder bed and move in a linear (X-Y axis) fashion to distribute and to level a new layer of powder prior to an increment of an energy beam, such as a laser beam or electron beam, scan processing. Such wipers are commonly of a construction similar to automotive windshield wipers. Selective laser manufacturing is limited to buildups starting from a flat build plate. Selective laser repair is limited to buildups starting on a component that is submerged below the top of the powder bed. Any solid protrusions above the powder bed are not allowed because such obstacles would prevent the sweeping action of the wiper that extends across the bed.

BRIEF SUMMARY

In one embodiment, a method of repairing a component using an additive manufacturing process includes submerging the component into a powder bed so that a portion of the component to be repaired is level with a surface of the powder bed and a protruding portion of the component protrudes above the surface of the powder bed, positioning a split wiper that includes a first wiper segment and a second wiper segment in the powder bed at the surface, advancing a quantity of powder by translating the first wiper segment and the second wiper segment across the surface of the powder bed, and directing a laser beam across the surface of the powder bed to fuse powder particles of the powder bed to the underlying substrate forming a layer of the component. Each of the first wiper segment and the second wiper segment follow a different contour of the protruding portion at the surface of the powder bed.

In another embodiment, a system for repairing a component utilizing a powder bed fusion additive manufacturing process includes a vessel containing a powder bed having the component, with a portion to be repaired submerged to a position where the portion is at a surface of the powder bed defined by a pocket in the component and with a protruding portion of the component that protrudes above the powder bed, a split wiper including a first wiper segment and a second wiper segment, and a beam energy source operably configured to direct a laser energy towards the powder bed to fuse the quantity of powder into a layer of additive material on the component. The first wiper segment and the second wiper segment are each configured to follow a different contour of the protruding portion at the surface of the powder bed. The first wiper segment advances a quantity of powder into a layer of additive material on the component.

In a further embodiment, a method of additively manufacturing a component includes positioning a first wiper segment at a first surface of the component and positioning a second wiper segment at a second surface of the component where the first and second surfaces are at different elevations. The method also includes operating an auger in front of each of the first wiper segment and the second wiper segment in a direction of translation, each auger including a power supply. Each auger is advanced along with the first and second wiper segment by translation across the first surface and the second surface, respectively. Each auger delivers powder along a length of the auger so that a quantity of powder is distributed on the respective surface. An energy beam is directed across the first surface and the second surface to fuse powder particles to the component forming a layer of the component.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
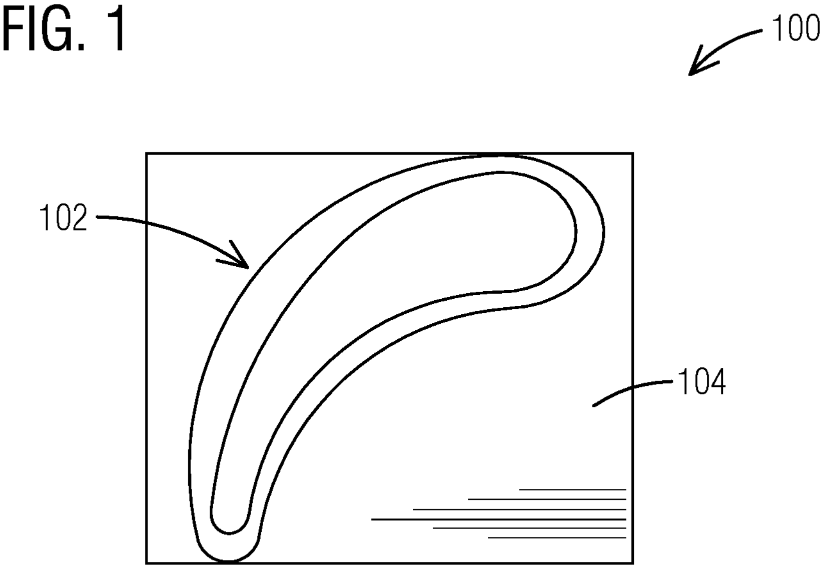
FIG. 1 is a top view of a turbine blade.
Figure 2:
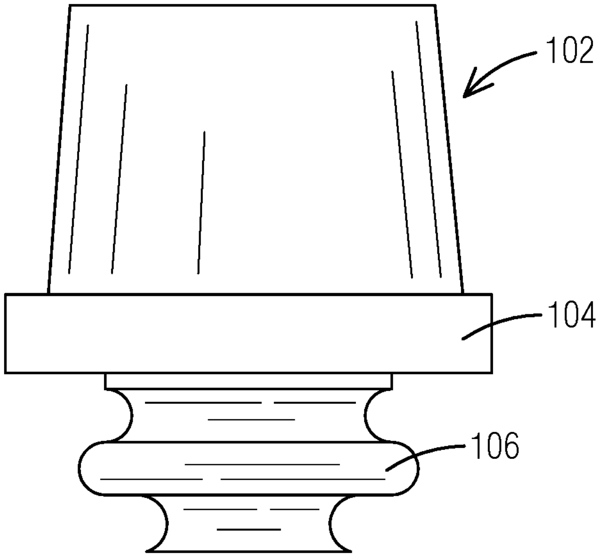
FIG. 2 is a side view of a turbine blade.

FIG. 1 and FIG. 2 illustrate a top and side view of a conventional turbine blade. The turbine blade 100 includes an airfoil 102, a platform 104, and a root 106. The root 106 may be configured to be slidably received into a respective axial groove in a rotor disc. The root 106 and the axial groove may be configured for interlocking engagement. The plane of the platform 104 may be approximately perpendicular to the extension of the blade airfoil 102.

Figure 3:
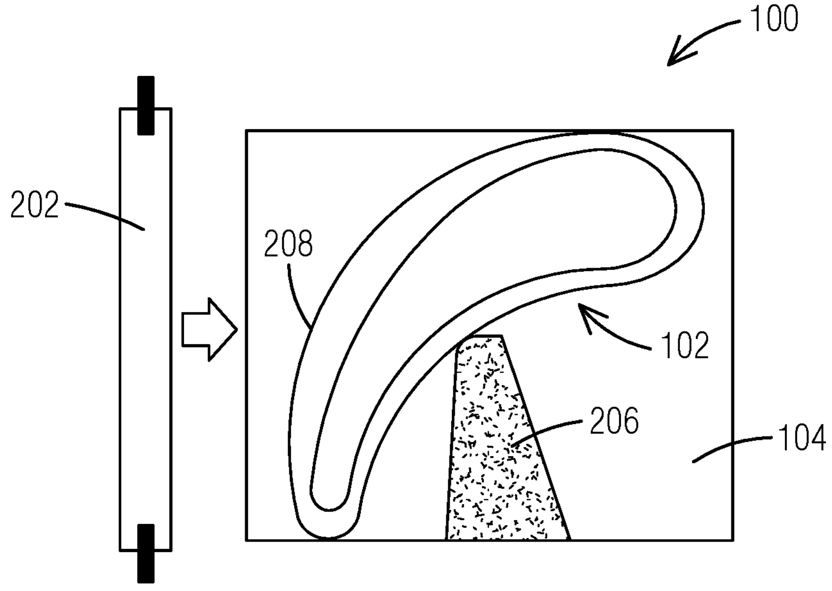
FIG. 3 is a top view of the turbine blade of FIG. 1 having damage.
Figure 4:
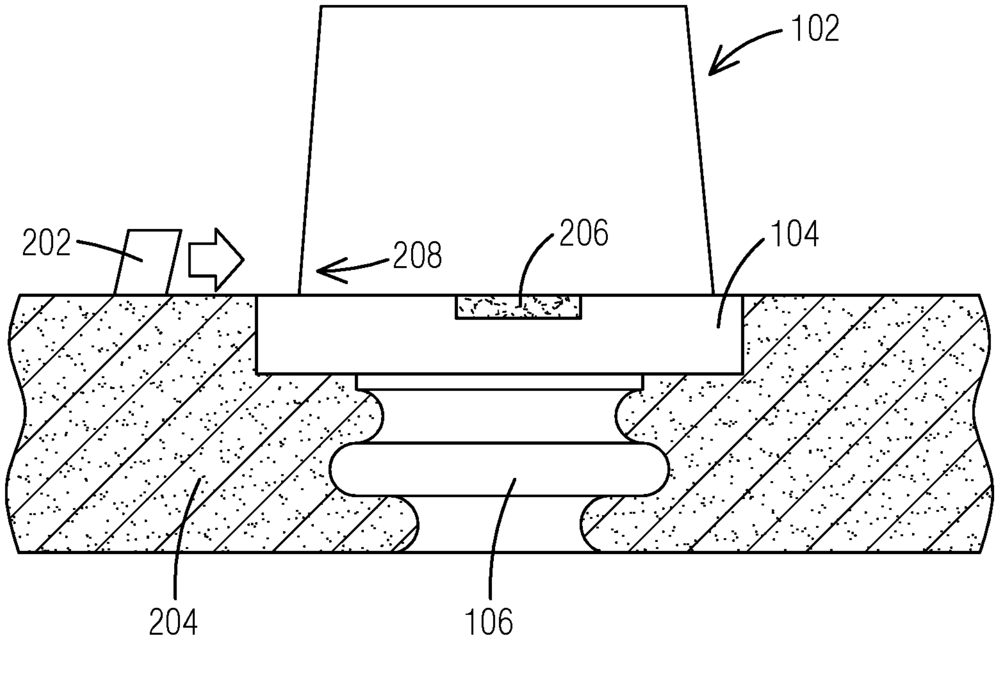
FIG. 4 is a side view of the turbine blade of FIG. 1 having damage.

Many components requiring repair are of complex shape and have areas needing repair that cannot be accessed with total submergence of the rest of the component. An example of this challenge is repair of platforms of gas turbine blades. FIG. 3 and FIG. 4 illustrate a top and side view of the turbine blade 100 of FIG. 1 and FIG. 2 having a section with damage 206 on the blade platform 104. Repair of components using SLM and SLS include submerging a component into a powder bed. However, in order to repair the damage 206 of the platform 104 using SLM or SLS, the blade airfoil 102 cannot be totally submerged in the powder bed 204. As can be seen in FIG. 3 and FIG. 4, the wiper 202 arm will not be able to translate across the plane of the platform 104 because the protruding airfoil 102 is an obstruction 208 to such motion.

Figure 5:
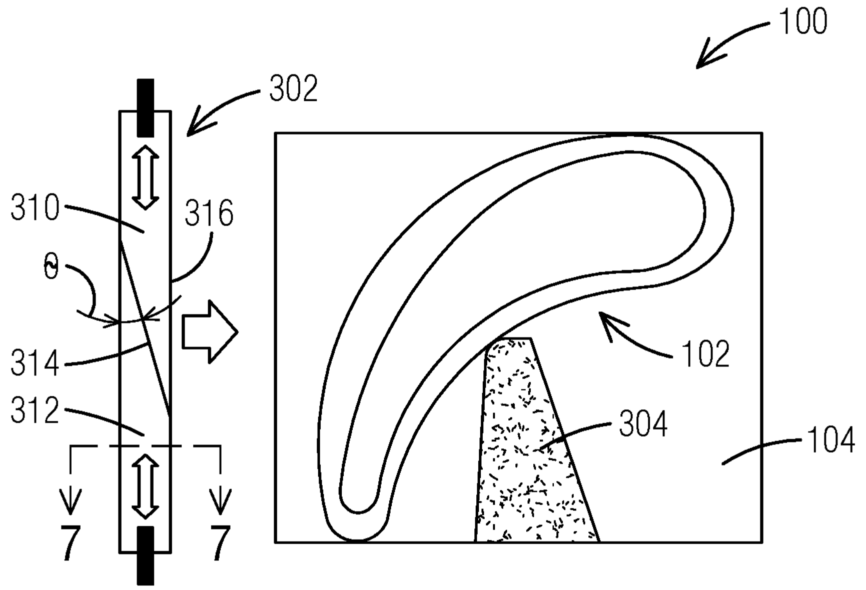
FIG. 5 is a top of the turbine blade of FIG. 1 and FIG. 2 utilizing a split wiper.
Figure 6:
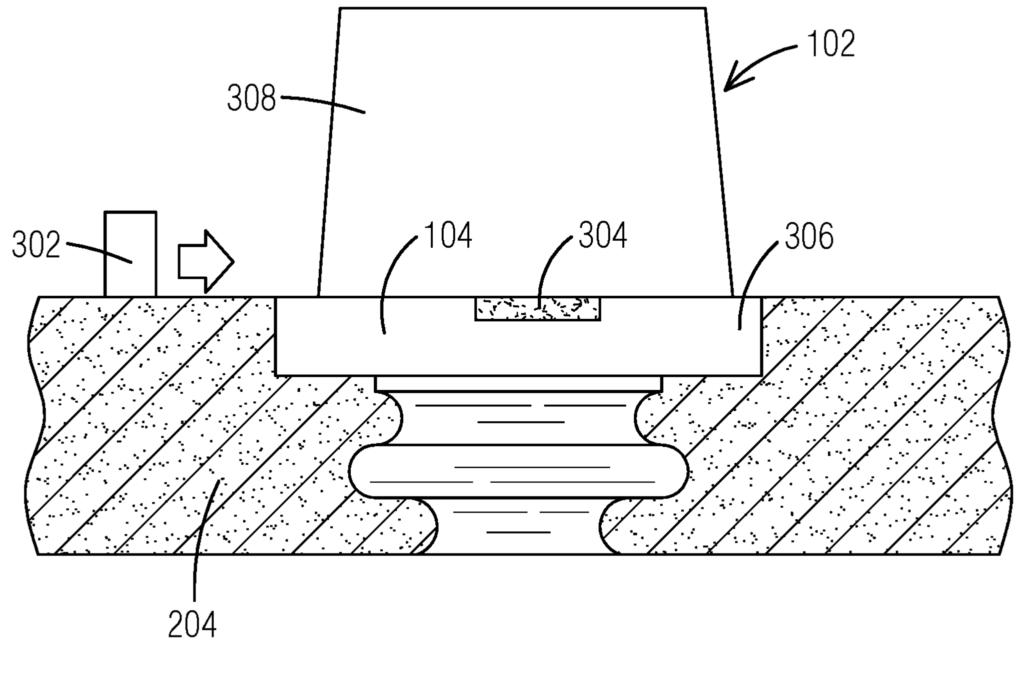
FIG. 6 is a side view of the turbine blade of FIG. 1 and FIG. 2 utilizing a split wiper.

This disclosure teaches a solution to powder bed processing when the component projects above the powder bed. FIG. 5 illustrates the turbine blade 100 of FIGS. 1-4 utilizing a split wiper 302 for an additive manufacturing process, such as SLM or SLS. The turbine blade 100 is submerged in a powder bed 204 so that a portion 306 of the component containing the damage 206, in this example the portion 306 is the platform 104 of the turbine blade, is at a surface of the powder bed 204 and a protruding portion 308 of the component, such as the shown airfoil 102, protrudes above the powder bed 204. A vessel may be provided that contains the powder bed 204. The damage 206 may include a pocket 304 in the portion 306 of the turbine blade 100 that requires repair such as by adding new layers of material to the turbine blade 100 by a laser powder bed fusion process. The pocket 304 may have been previously created by a machining process, for example, to remove damage 206 such as a crack.

In an embodiment, a split wiper 302 may be provided. The split wiper 302 may include a first wiper segment 312 and a second wiper segment 310. The first wiper segment 312 and the second wiper segment 310 may be positioned in the powder bed 204 in adjacent contact projecting from opposite sides of the edges of the powder bed 204. In one construction, the first wiper segment 312 and the second wiper segment 310 each include a wiper blade having an end surface 314 and a side surface 316 such that the end surface 314 cooperates with the side surface 316 to define an acute angle (θ) therebetween. The acute angle (θ) may be varied to best suit different component geometries. For example, the angle (θ) of the wiper blade may be configured to accommodate the angle of a final edge 702 from a pocket 304 that requires repair (see FIG. 10). The wiper blade is configured to advance and level a quantity of powder in the powder bed 204.

Figure 7:
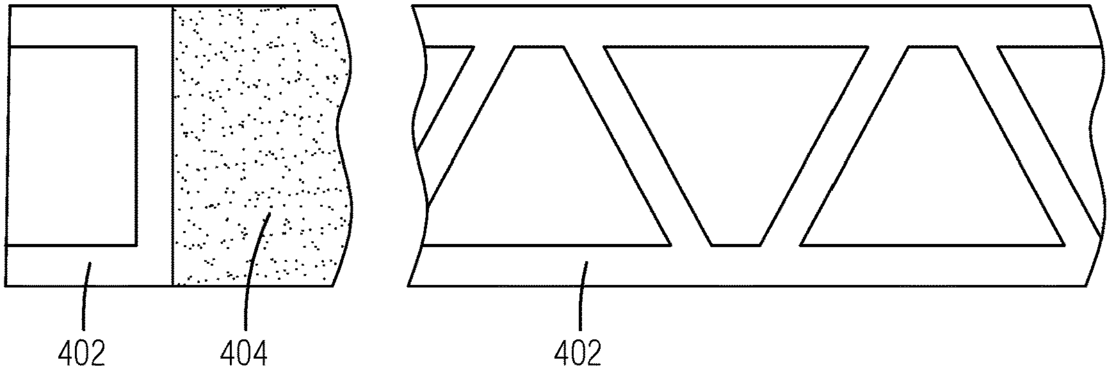
FIG. 7 is a side view and a cross-sectional view of a wiper segment with support.

The wiper blade of the first wiper segment 312 and second wiper segment 310 for powder bed leveling may need support in order to maintain proper contact with the intended surface. Thus, in one construction, the first wiper segment 312 and/or the second wiper segment 310 includes a rigid cantilevered support structure 402 and a wiper blade 404 that extends along the axis of the wiper segment 312 to keep the wiper blade 404 level with the intended plane of processing in the powder bed 204. In an embodiment, shown in a cross-sectional view on the left side of FIG. 7, cross section taken along line 7-7 of FIG. 5, the support structure 402 includes a C-channel shape providing adequate stiffening in the X-Y plane (plane of powder). In a side view in FIG. 7, shown on the right side of FIG. 7, the C-channel support structure 402 includes braces between the top and bottom of the inside edges of the C-channel support structure 402 to assist in keeping the wiper blade 404 level over the cantilevered length.

Figure 8:
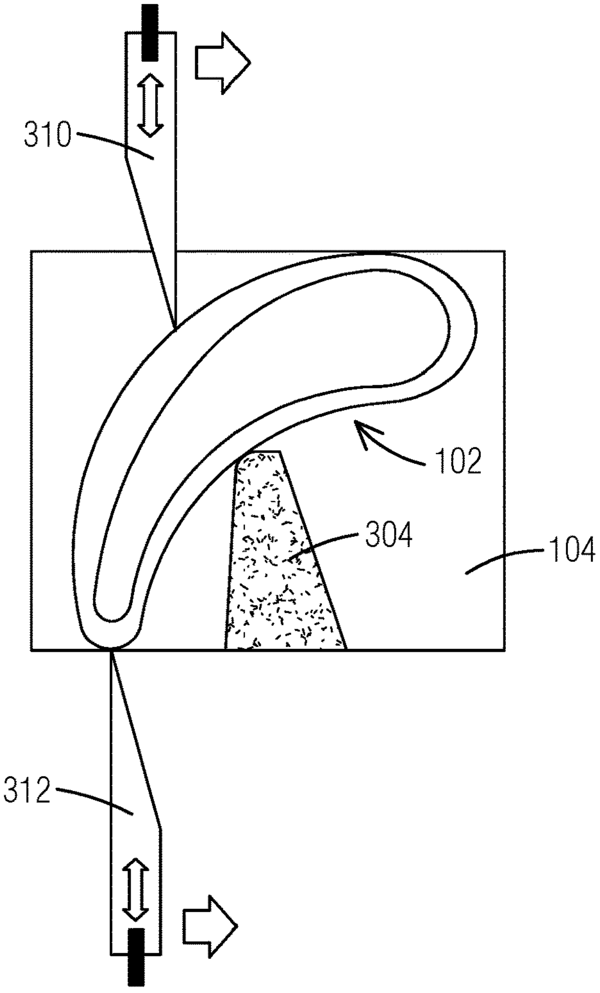
FIG. 8 is a top view of the turbine blade during a split wiper translation step.

FIG. 8 illustrates a split wiper translation step in the exemplary AM powder bed fusion process. Each of the first wiper segment 312 and the second wiper segment 310 advance powder by translation across the powder bed 204. In the illustrated example, the movement is from left to right as shown by the arrows. The second wiper segment 310 and the first wiper segment 312 each follow a different contour of the component. In this case, the second wiper segment 310 is laterally positioned to follow the convex contour of the blade airfoil 102. The first wiper segment 312 is positioned to follow the concave contour of the blade airfoil 102. The illustrated example shows the first wiper segment 312 approaching the portion of the platform 104 to be repaired, defined by the pocket 304.

In certain embodiments, the advancement of the powder by the wiper segments may include an oscillating motion, i.e., an axial back and forth motion shown by double arrows, of the wiper segments to help enhance powder filling and distribution. Additionally, in embodiments, each wiper segment may be vibrated along its axis parallel and/or perpendicular to the direction of the translation of the wiper segment across the powder bed 204 to enhance powder distribution.

Figure 9:
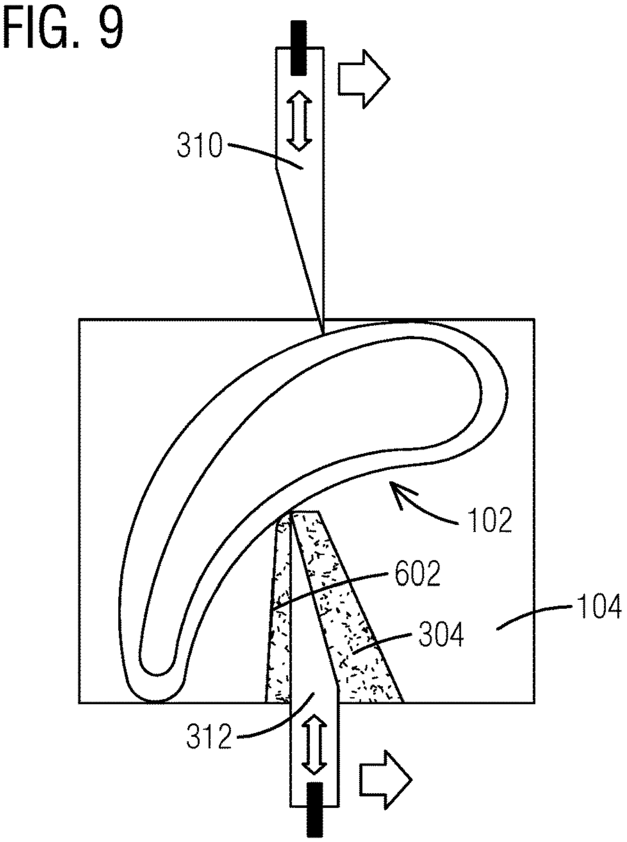
FIG. 9 is a top view of the turbine blade during a further split wiper translation step.

FIG. 9 illustrates a further split wiper translation step in the exemplary AM powder bed fusion process. The second wiper segment 310 continues to follow the convex blade contour. The first wiper segment 312 may push a quantity of powder into the pocket 304 in order to level powder in the pocket 304. In order to level powder in the pocket 304, however, the first wiper segment 312 needs to be lowered a predetermined depth. Thus, in an embodiment, the first wiper segment 312 is lowered the predetermined depth at an edge of the pocket 304. The predetermined depth may depend on the depth of the pocket 304 and the desired layer thickness of the layer to be added to the component. Typically, a layer of added material to a component produced by a powder bed fusion process is approximately 20 microns. In the embodiment shown in FIG. 9, the lowering of the first wiper segment 312 occurs at the position where the left-hand edge 602 of the pocket 304 is encountered. Once lowered, the first wiper segment 312 advances powder across the width of the pocket 304.

Figure 10:
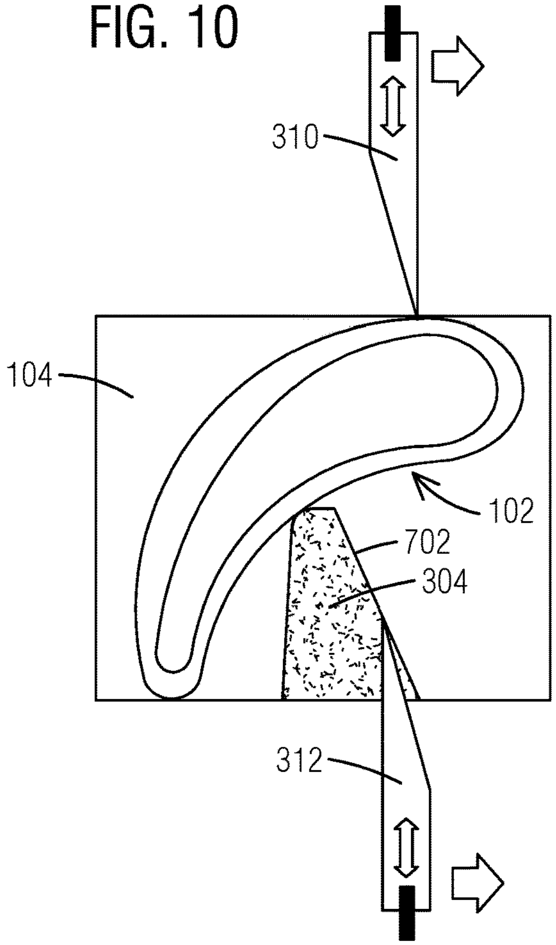
FIG. 10 is a top view of the turbine blade during another split wiper translation step.

FIG. 10 illustrates another split wiper translation step in the exemplary AM powder bed fusion process. In this step, the second wiper segment 310 starts rounding the leading edge of the airfoil 102. The first wiper segment 312 is positioned to exit the pocket 304. As shown, the angled profile of the wiper blade assists in pushing powder toward the final edge 702 of the pocket 304, in the direction of the wiper translation.

In a last step, once the split wiper finishes its translation across the powder bed 204, an energy beam may be directed across the surface of the powder bed 204 fusing powder particles of the powder bed 204 together and to the underlying substrate to form a layer of the platform 104. In the example process shown in FIGS. 1-10, the energy beam may be directed across the width of the pocket 304 forming a layer of the platform 104 inside the pocket 304. The steps may be repeated a number of times until the component is repaired. In the example process shown in FIGS. 1-10, the AM process may be complete when a last layer reaches the plane of the platform 104.

In an embodiment, the translation of each of the first wiper segment 312 and the second wiper segment 310, respectively, may be controlled by a position controller. The position controller may be preprogrammed so that each wiper segment follows a different contour of the protruding portion's geometry at the surface of the powder bed 204.

Preprogramming a component's geometry may not be feasible for every component particularly repair of components of indeterminate geometry.

In certain embodiments, the position controller may employ a tracking or sensing method. In one embodiment, for example, a mechanical contact probe, such as an extensometer, could precede the first wiper segment 312 location to provide the direction of the first wiper segment extension when it reaches the probe location. In another embodiment, an electrical contact may be utilized to direct the first wiper segment extension. The electrical conductivity of the component and first wiper segment 312 provides a circuit to adjust wiper extension. An electrical contact at an end of the first wiper segment 312 may provide information to direct first wiper segment extension to follow the contour of the protruding portion of the component. One approach involves incremental extension of the first wiper segment 312 until it causes closure of electrical circuit through the first wiper segment 312 and the component and then retraction of the first wiper segment 312 until an open circuit is achieved. The extension information collected provides the direction of the adjustment of the first wiper segment 312. A similar approach involves applying a voltage between the component and the first wiper segment 312. When a short circuit is detected then positional information is provided for wiper tracking of the component's contour. In a further embodiment, the tracking and sensing method utilizes optical sensing that may include pre-process vision tracking or in-process vision tracking, e.g., laser vision tracking. Optical triangulation may provide very accurate component location to direct the first wiper segment extension. Similar positioning methods may also apply to direct the second wiper segment extension.

Figure 11:
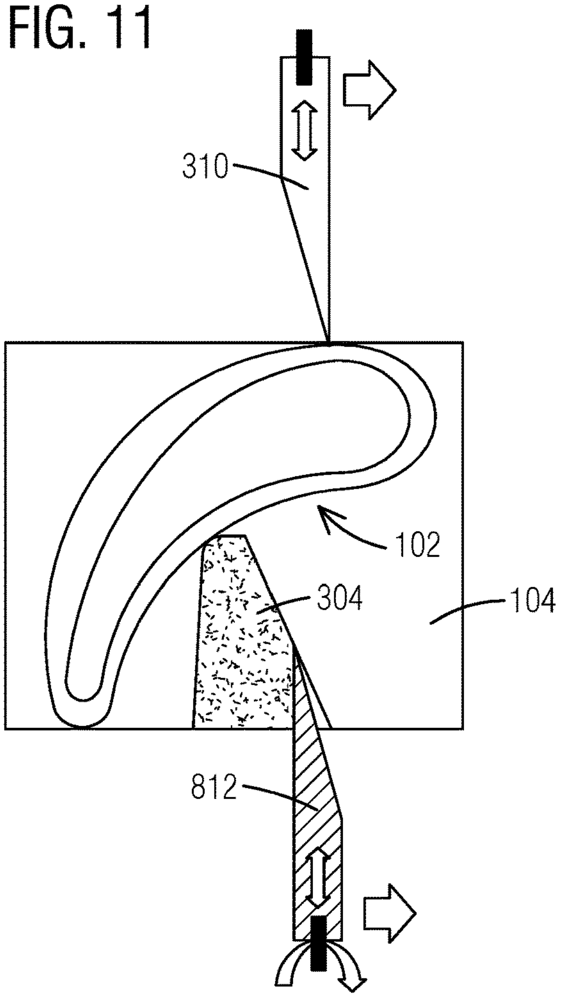
FIG. 11 is a top view of the turbine blade utilizing an auger wiper to provide lateral powder transport.

In one construction, as shown in FIG. 11, the first wiper segment 312 includes an auger 812. The auger 812 may be generally cylindrical having spiral convolutions on its surface, (e.g., a screw). Challenges of advancing powder into the pocket 304 solely with a wiper blade would be delivering powder to remote areas of the pocket as well as delivering powder evenly across the pocket 304. Thus, a mechanism to achieve such delivery may be an auger. In contrast to a wiper blade, an auger can deliver powder into the pocket 304 along its length so that powder is generally evenly distributed throughout the pocket 304. Rotation of the auger partially submerged in the powder bed 204 may deliver powder toward the end of the auger and into difficult to reach portions of the pocket 304. Alternately, the wiper blade may include serrations along its length to enhance powder transport perpendicular to the direction of translation. A circular sweep of the wiper blade would further enhance this action.

Figure 12:
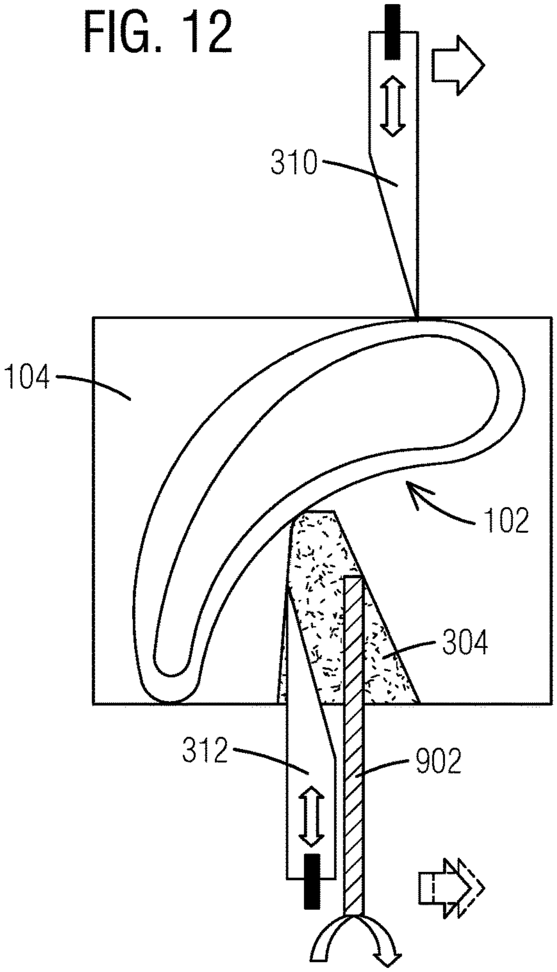
FIG. 12 is a top view of the turbine blade utilizing an auger preceding a wiper blade to provide lateral powder transport.

However, by utilizing only an auger without a wiper blade, the advanced powder may not be accurately leveled. Thus, in another construction shown in FIG. 12, an auger 902 precedes the movement of the first wiper segment 312 when the first wiper segment 312 includes a wiper blade. The auger 902 may be partially submerged in the powder bed ahead of the wiper blade in the pocket 304, in the direction of the translation, operating to deliver powder along its length so that powder is distributed throughout the pocket 304.

Figure 13:
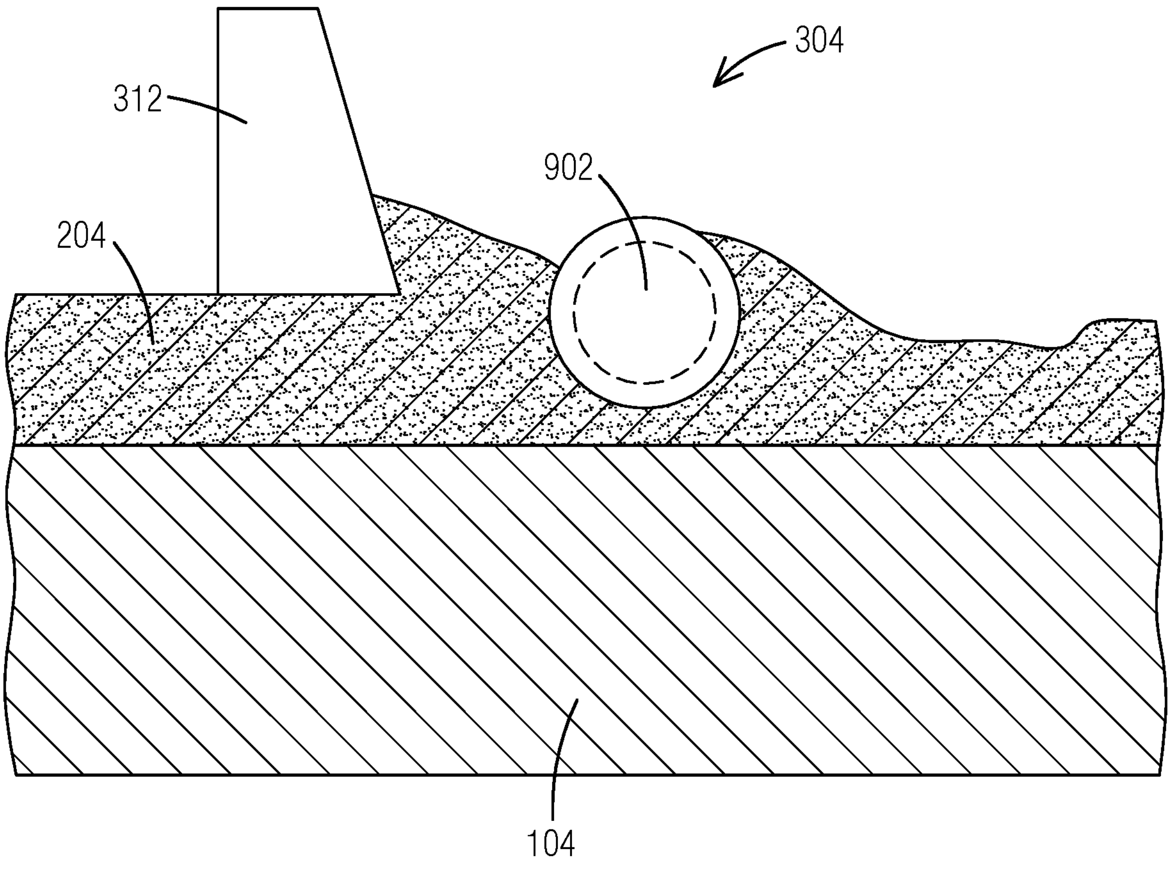
FIG. 13 is a side view of an auger delivering powder, preceding a wiper blade leveling the powder.

FIG. 13 illustrates a side view of the auger 902 preceding the first wiper segment 312 embodied as a wiper blade in the pocket 304. The auger 902 delivers and distributes the powder along its length throughout the pocket 304 with the wiper blade following to level the distributed powder.

Figure 14:
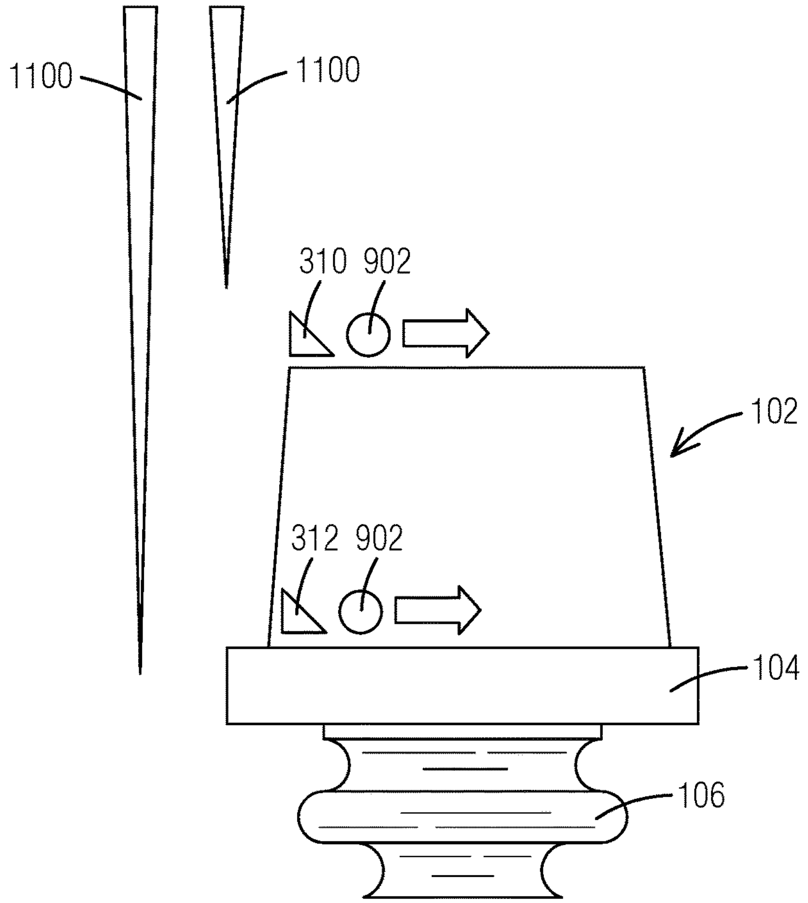
FIG. 14 is a side view of a turbine blade utilizing a split wiper at different elevations.

FIG. 14 illustrates an embodiment having a split wiper with a first wiper segment 312 and a second wiper segment 310 advancing and leveling powder at different elevations of the exemplary turbine blade 100. The first wiper segment 312 and the second wiper segment 310 are thus positioned at surfaces at different elevations. Preceding each of the first wiper segment 312 and the second wiper segment 310 in a direction of translation, shown by the arrows in the figure, is an auger 902 configured to deliver powder along its axis. The first wiper segment 312 and the second wiper segment 310 each follow the respective auger 902 in the direction of translation delivering powder to the respective surface. An energy beam 1100, or plurality of energy beams, may be optically directed at the respective surfaces to fuse the powder to the underlying surface creating a layer of the turbine blade on each surface. For this embodiment, powders having different compositions may be utilized on the different surfaces to satisfy local properties such as corrosion resistance, strength, ductility, or erosion resistance, for example.

Figure 15:
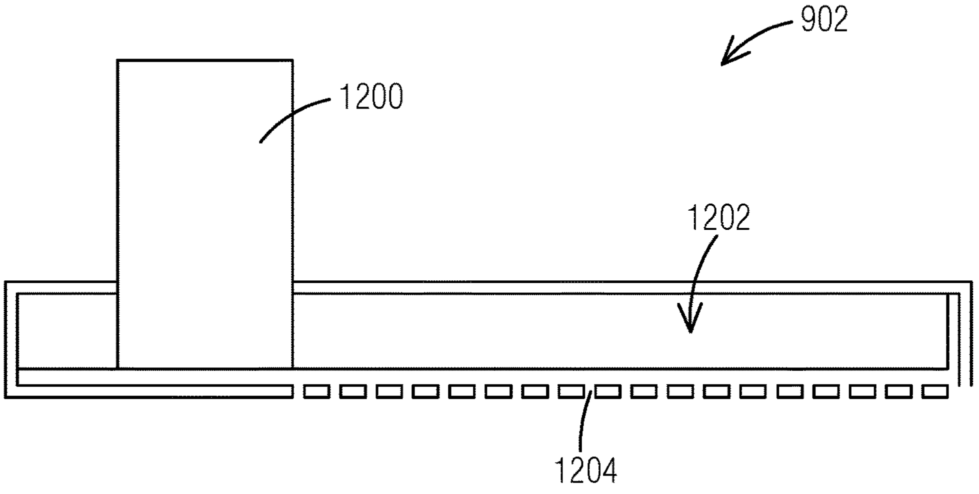
FIG. 15 is a side view of an auger utilizing a powder hopper.

FIG. 15 illustrates a side view of an auger 902 including an attached powder supply, for distributing powder, to a surface such as those exemplified in FIG. 14. The powder supply may be in the form of an attached powder hopper 1200 that distributes the powder out of perforations 1204 in a sleeve 1202 of the auger 902 to the respective surface.

While the examples shown in FIGS. 1-15 illustrate a component undergoing a repair, the described AM process utilizing a split wiper may also benefit a component built from scratch, especially in embodiments where the component may include varying process parameters (e.g. different powder layer thicknesses). For example, various vertical extensions of the component may be processed in different steps without an existing extension interfering with one previously built on. In another example, a split wiper may be utilized in an AM process where a component has portions needing different powder alloys or utilizing different build directions. For this example, the component could be removed from the powder bed for a change of powder alloy or for a change in component orientation. Again, an existing extension would not interfere with additional processing.

A split wiper having at least two wiper segments allows components having complex shapes needing repair to utilize powder bed fusion additive manufacturing processes. Powder bed fusion processes have the advantage of very low heat input and are very precise processes producing components with intricate details. Each split wiper segment may follow a different contour of a component having portions that protrude above the powder bed or within different powder beds at different elevations.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A system for repairing a component utilizing a powder bed fusion additive manufacturing process, comprising:

a vessel containing a powder bed having the component, with a portion to be repaired submerged to a position where the portion is at a surface of the powder bed defined by a pocket in the component and with a protruding portion of the component that protrudes above the powder bed;

a split wiper comprising a first wiper segment and a second wiper segment, the first wiper segment and the second wiper segment each configured to follow a different contour of the protruding portion at the surface of the powder bed, wherein the first wiper segment advances a quantity of powder into the pocket in the component; and a beam energy source operably configured to direct a beam energy towards the powder bed to fuse the quantity of powder into a layer of additive material on the component, and a controller configured to control a translation of the first wiper segment and the second wiper segment so that each of the wiper segments follows the different contour of the protruding portion, respectively.

2. The system of claim 1, wherein the first wiper segment includes a wiper blade comprising a side surface and an end surface that cooperates with the side surface to define an acute angle therebetween, the first wiper segment advancing and leveling powder of the powder bed.

3. The system of claim 1, wherein the first wiper segment includes a cantilevered support structure supporting the wiper blade to maintain a position at the surface during advancing and leveling of the quantity of powder into the pocket.

4. The system of claim 1, wherein the first wiper segment includes an auger that operates to deliver powder into the pocket along a length of the auger into the pocket so that powder of the powder bed is distributed into the pocket.

5. A method of repairing a component using an additive manufacturing process using the system of claim 1, the method comprising:

submerging the component into the powder bed so that the portion of the component to be repaired is level with the surface of the powder bed and the protruding portion of the component protrudes above the surface of the powder bed;

positioning the split wiper that includes the first wiper segment and the second wiper segment in the powder bed at the surface;

advancing the quantity of powder by translating the first wiper segment and the second wiper segment across the surface of the powder bed, wherein each of the first wiper segment and the second wiper segment follow the different contour of the protruding portion at the surface of the powder bed; and directing an energy beam across the surface of the powder bed to fuse powder particles of the powder bed to an underlying substrate forming a layer of the component.

6. The method of claim 5, wherein the first wiper segment includes a wiper blade comprising a side surface and an end surface that cooperates with the side surface to define an acute angle therebetween.

7. The method of claim 6, wherein the quantity of powder is pushed by the first wiper segment into a pocket in the component defining the portion to be repaired.

8. The method of claim 7, wherein the advancing further comprises lowering the wiper blade at an edge of the pocket into the pocket a predetermined depth to advance powder across a width of the pocket.

9. The method of claim 7, further comprising advancing an auger partially submerged in the powder bed ahead of the translation of the wiper blade in the pocket and operating the auger to deliver powder along a length of the auger so that powder is distributed throughout the pocket.

10. The method of claim 5, wherein the advancing further comprises delivering powder into a pocket in the component defining the portion to be repaired by the first wiper segment, wherein the first wiper segment includes an auger that is partially submerged into the powder bed and wherein the auger delivers powder into the pocket along a length of the auger so that powder is distributed throughout the pocket.

11. The method of claim 5, wherein the advancing further comprises oscillating the first wiper segment in the direction along the axis of the first wiper segment.

12. The method of claim 5, further comprising controlling by the controller the translating of the first wiper segment and the second wiper segment so that each follows the different contour of the protruding portion at the surface of the powder bed, wherein the controlling includes preprogramming the controller to include the contour geometry of the protruding portion at the surface so that each of the first wiper segment and the second wiper segment follows a different contour of the protruding portion.

13. The method of claim 12, wherein the controlling includes utilizing a tracking and sensing method to control the translation of the first wiper segment and the second wiper segment so that each follows a different contour of the protruding portion of the component.

14. The method of claim 5, further comprising vibrating the first wiper segment along its axis and parallel or perpendicular to the direction of the translation across the powder bed for powder distribution.

15. The method of claim 5, wherein the additive manufacturing process is a laser powder bed fusion process.

16. The method of claim 5, wherein the component is a turbine blade.

17. A method of additively manufacturing a component using the system of claim 1, the method comprising:

positioning the first wiper segment at a first surface of the component;

positioning the second wiper segment at a second surface of the component, the first and second surface at different elevations;

operating an auger in front of each of the first wiper segment and second wiper segment in a direction of translation, each auger including a powder supply;

advancing each auger and the first and second wiper segment by translation across the first surface and the second surface, respectively, wherein each auger delivers powder along a length of the auger so that the quantity of powder is distributed on the respective surface;

directing an energy beam across the first surface and the second surface to fuse powder particles to the component forming a layer of the component.

18. The method of claim 17, wherein each auger includes an attached powder hopper for delivering powder to the attached auger, and wherein each auger includes a sleeve with perforations for distributing powder to the first surface and/or to the second surface, respectively.

* * * * *